United States Patent
Li et al.

(10) Patent No.: US 6,654,363 B1
(45) Date of Patent: Nov. 25, 2003

(54) IP QOS ADAPTATION AND MANAGEMENT SYSTEM AND METHOD

(75) Inventors: Xiao-Dong Li, Ottawa (CA); Jiandong Zhuang, Nepean (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/472,804

(22) Filed: Dec. 28, 1999

(51) Int. Cl.[7] .................................................. H04Q 7/20
(52) U.S. Cl. ..................................... 370/338; 370/395.6
(58) Field of Search ................................. 370/338, 349, 370/335, 342, 395.52, 395.53, 395.6, 441, 320, 352–356, 230, 235, 328, 278, 474, 469; 709/204, 231, 238

(56) References Cited

U.S. PATENT DOCUMENTS

| | | | | |
|---|---|---|---|---|
| 5,159,592 A | * | 10/1992 | Perkins ......................... 370/338 |
| 6,094,431 A | * | 7/2000 | Yamato et al. ......... 370/395.21 |
| 6,130,880 A | * | 10/2000 | Naudus et al. ............... 370/235 |
| 6,160,793 A | * | 12/2000 | Ghani et al. ................. 370/236 |
| 6,160,804 A | * | 12/2000 | Ahmed et al. ............... 370/349 |
| 6,172,990 B1 | * | 1/2001 | Deb et al. ..................... 370/466 |
| 6,230,012 B1 | * | 5/2001 | Willkie et al. ............... 455/435 |
| 6,295,285 B1 | * | 9/2001 | Whitehead .................. 370/245 |
| 6,377,931 B1 | * | 4/2002 | Shlomot .................... 369/44.32 |
| 6,400,712 B1 | * | 6/2002 | Phillips ...................... 370/355 |
| 6,405,251 B1 | * | 6/2002 | Bullard et al. ............... 709/224 |
| 6,424,650 B1 | * | 7/2002 | Yang et al. .................. 370/390 |
| 6,434,134 B1 | * | 8/2002 | La Porta et al. ............ 370/338 |
| 6,434,153 B1 | * | 8/2002 | Yazaki et al. .......... 370/395.21 |
| 6,477,670 B1 | * | 11/2002 | Ahmadvand ................. 714/712 |

OTHER PUBLICATIONS

A. Baiocchi, F. Cuomo, L. Dell'Uomo and U. Teloni, A MAC Protocol Supporting IP with QOS Guarantees in a Wireless Local Loop, pp. 1162–1166, date Dec. 5, 1999.
TR45 Medium Access Control (MAC) Standard for cdma2000 Spread Spectrum Systems, "cdma2000 Phase 1 MAC (IS–2000–3) Ballot Comment Resolution Text", MAC Ad Hoc Group, D.N. Knisely (Chair), c/o Lucent Technologies, Jul. 12, 1999, TIA.

\* cited by examiner

*Primary Examiner*—Dwayne Bost
*Assistant Examiner*—Jean A Gelin

(57) ABSTRACT

Provided is an IP QoS management mechanism for modern wireless networks to guarantee delivery of IP services with the required quality through the networks to customers. A layered QoS management architecture is provided which performs the QoS control over the entire communication protocol stack of a wireless network. The architecture consists of two levels of IP QoS management with an adaptation interface between them. These different functional and adapting levels are called from top to bottom, Upper Layer QoS Management (ULQM), IP QoS adaptation (IQA), and Lower Layer QoS Management (LLQM).

24 Claims, 8 Drawing Sheets

IP QOS ADAPTATION AND MANAGEMENT SYSTEM AND METHOD

FIELD OF THE INVENTION

This invention relates to methods and systems for delivering Quality of Service (QoS) on IP packet based connections over a wireless link.

BACKGROUND OF THE INVENTION

The Internet is evolving to support Quality of Services in addition to the existing Best Effort services. Two service frameworks are being developed by the Internet Engineering Task Force (IETG) to provide guarantees for service quality in IP (Internet Protocol) networks. They are the Integrated Services (IntServ) model, and the Differentiated Services (DiffServ) model.

The IntServ model is based on resource reservation on a per flow or aggregate basis to support applications that require bounded delay and bandwidth. It uses the Resource Reservation Protocol (RSVP) to set up paths and reserve resources for a packet data flow on an end-to-end basis, thereby providing hard QoS guarantees.

The DiffServ model was proposed for implementing scalable service differentiation in the Internet. It classifies and marks IP packets through the setting of the DS/TOS field of each packet's IP header to give them a particular per hop forwarding behavior on nodes along their paths. The packets are forwarded based on their markings, in other words, they are given certain per hop behavior (PHB). The general QoS parameters considered for packet data are delay, packet error rate, and data rate. In the DiffServ model, these parameters may be implicitly expressed through the values of the DS field.

As wireless networks, and in particularly CDMA networks, evolve to support IP capabilities, they need an effective mechanism for transferring QoS signaling over the air. It would be advantageous if wireless networks could support end-to-end QoS signaling adopted by wire line IP networks. One example of such a mechanism for RSVP signaling has been provided in Applicant's application Ser. No. 60/153749 filed Sep. 13, 1999. While an effective QoS signaling mechanism is taught, a QoS delivery mechanism for providing the agreed upon QoS is not. Furthermore, no mechanism for delivering DiffServ functionality is provided.

To provide end-to-end QoS management, wireless networks including mobile cellular networks and fixed wireless networks should support the IP service models for QoS management such as the IntServ and/or DiffServ models. However, existing wireless networks such as the cellular IS-136 TDMA networks or the cellular IS-95 CDMA networks do not provide IP services with guaranteed service qualities for customers. Consequently, IP QoS management is a new issue for wireless engineering. There are no readily available solutions for technically supporting such a function in wireless networks.

In the current cdma2000 standards, the MUX and QoS sub-layer adds a 3-bit SRID to the data frame to be sent over the air. On the receiving end, the MUX and QoS function has to recover the SRID and relies on it to determine which appropriate service instance will deal with the data packet. The SRID is generated by a mobile terminal during the registration process and communicated to the base station through an origination message. The base station or network is not responsible for creation of SRID. The existing SRID is not related to any particular IP QoS requirement or data flow. This is because the existing Link Layer in cdma2000 standards is not IP-aware. As a result, the existing cdma2000 standards cannot support specific IP QoS for a specific data flow.

SUMMARY OF THE INVENTION

IP QoS management systems and methods are provided which allow wireless networks to allocate radio resources to each service request more efficiently than would be the case where IP QoS management is not available. This advantage comes from the fact that IP QoS management enables wireless networks to perform resource allocation on demand to meet QoS requirements of IP services. From the frequency spectrum efficiency perspective, this is very beneficial to wireless networks as radio frequency spectrum resources are scarce in nature and are a major limiting factor on network capacities.

The present invention provides IP QoS management solutions in wireless networks and, to this end, provides a method and apparatus for IP QoS management.

The invention provides an IP QoS management mechanism for modern wireless networks to guarantee delivery of IP services with the required quality through the networks to customers. In order to realize IP QoS management in wireless networks, the invention provides a layered QoS management architecture which performs the QoS control over the entire communication protocol stack of a wireless network. The architecture consists of two levels of IP QoS management with an adaptation interface between them. These different functional and adapting levels are called, from top to bottom, Upper Layer QoS Management (ULQM), IP QoS adaptation (IQA), and Lower Layer QoS Management (LLQM).

The ULQM is responsible for IP QoS management in the Upper Layers of a wireless network for end-to-end QoS delivery. In contrast, the LLQM takes charge of managing IP QoS in the Link Layer and Physical Layer of the network. To shield the LLQM from burdens caused by coping with application details from the Upper Layers, the IQA plays a role in buffering and adapting the QoS signaling flow from the Upper Layers to prevent it from directly entering into the LLQM without adaptation. Therefore, the IQA allows the ULQM and LLQM to work independently of each other. In addition to this functionality, the IQA also provides a link between the LLQM and the ULQM in the form of a QoS delivery path from the Upper Layers to the Link Layer and Physical Layer of the network to consistently provide an IP QoS management flow over a wireless link.

The IQA sub-layer contains two entities. One is called the IP QoS Adaptation Control Function (IQACF), residing in the control plane of the communication protocol stack and the other is called the IQA Entity (IQAE), residing in the data plane of the stack.

In a preferred embodiment, the invention is incorporated in a cdma2000 wireless system to perform IP QoS management so that the cdma2000 wireless system can deliver IP services with the required QoS to its customers. Preferably, the IQA is inserted as a sub-layer between the Upper Layers and the Link Layer of the system. In the cdma2000 context, the invention provides a mechanism to make the Link Layer be aware of the IP QoS requirement by inserting an IQA sub-layer, and uses a mapping function to generate an SRID based on the IP QoS parameters and endpoints. This way, the desired QoS can be supported by the Link Layer and the Physical Layer via the SRID—logical channel—physical channel association. Furthermore, the invention provides a method to support dynamic change of QoS both at the mobile terminal and from the network side at the base station. In the event a new QoS request is initiated by the IP application through a change of value in the DS field, the IQAE at the mobile or the base station can detect such a change and initiate a service negotiation process to accommodate the new request. Such a dynamic QoS mechanism is not available in the existing cdma2000 standards.

In a cdma2000 system, the ULQM can be implemented by using the TCP/UDP/IP sub-layer in the Upper Layers of the system. More generally, preferably a standard solution for the realization of the ULQM is employed.

As for the LLQM, however, there are no clearly available solutions specified by the present cdma2000 standard. While a complete LLQM realization would be related to all aspects of the Link Layer including LAC retransmission protocol, request admission control, dynamic resource allocation, handoff management, LAC and MAC signaling, and logical resource to physical resource mapping, such a detailed solution is beyond the scope of this invention. These details can easily be worked out by persons skilled in the art. Rather, the invention provides a high level solution to the problem and gives a methodology for conceptually implementing the LLQM in the Link Layer of a cdma2000 system.

With the IQA sub-layer and the ideas and methodologies provided by the invention to implement the ULQM and LLQM in the Upper Layers and Link Layer of a cdma2000 system, the entire QoS management on the network can be effectively supported. Advantageously, it guarantees end-to-end QoS for delivered IP services across the network. Also, it allows resource utilization of a cdma2000 system to be more efficient than would be the case where IP QoS management is not available. This benefit is gained due to the system being able to allocate its resources on demand by QoS requirements of IP services. This means the system can avoid any over-provisioning of resources and can operate more economically.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
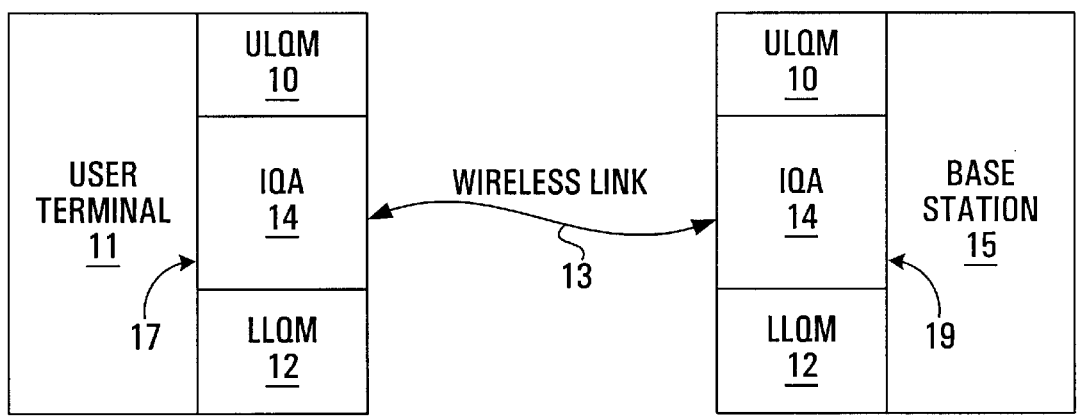
FIG. 1 illustrates an IP QoS management architecture for delivering IP QoS in wireless networks according to an embodiment of the invention.

An embodiment of the invention provides an IP QoS management mechanism for modern wireless networks to guarantee delivery of IP services with the required QoS through the networks to customers. To realize this, referring to FIG. 1, an embodiment of the invention provides a layered architecture for the delivery of IP QoS services over a wireless link 13. Shown is a wireless user terminal 11 connected through wireless link 13 to a base station 15 forming part of a wireless communications network (not shown). The QoS management architecture as implemented in the user terminal 11 is generally indicated by 17. The QoS management architecture as implemented in the base station 15 is generally indicated by 19. In both cases, the QoS management architecture 17,19 consists of three functional layers called, from top to bottom, Upper Layer IP QoS management (ULQM) 10, the IP QoS adaptation sub-layer (IQA) 14 and Lower Layer QoS management (LLQM) 12.

Such a layered architecture for IP QoS management has been chosen as it is suited to be implemented within/as an adaptation of the layered architecture that a modern wireless network has within its existing communication protocol stack, which generally conforms to the seven-layer reference model of the International Standards Organization for open systems architecture. The seven-layer model contains layers of Application, Presentation, Session, Transport, Network, Link and Physical. In cdma2000, the layers above the Link Layer are referred to as Upper Layers. Hence, the cdma2000 protocol stack consists of Upper Layers, a Link Layer in the middle and a Physical Layer at the bottom. It is to be understood that the user terminal 11 and base station 15 each have such a protocol stack, but that only details relevant to IP QoS management are being shown and described.

The ULQM 10 is responsible for the IP QoS management in the Upper Layers of the network and the LLQM 12 is responsible for the IP QoS management in the Link Layer and Physical Layer of the network. The IQA 14 is between the ULQM 10 and the LLQM 12 and functions to shield the LLQM 12 from burdens which would otherwise exist in coping with the application details from the Upper Layers.

Logically, both the base station 15 and the user terminal 11 in a wireless network include the same communication protocol stack consisting of the Upper Layers, Link Layer and Physical Layer. Each layer in the stack can be further divided into several sub-layers. For example, the Upper Layers contain an application layer, a TCP/UDP layer, an IP layer and other application and protocol sub-layers. Likewise, the Link Layer contains a Link Access Control (LAC) sub-layer and Media Access Control (MAC) sub-layer. Each pair of identical sub-layers on the base station side and on the user terminal side constitutes a pair of peers in the whole communication protocol stack including both individual stacks of the base station 15 and the user terminal 11. When an IP service is delivered from the base station 15 to the user terminal 11, the corresponding IP traffic and control signaling will be transferred between the protocol peers on both sides. The direction of this transfer could be from the base station 15 to the user terminal 11 or vice versa.

The IP QoS management architecture provided by the invention is implemented in both the base station 15 and the user terminal 11. However, since it is the base station's job to control radio resource allocation in a wireless system, the IP QoS management architectures implemented on the base station 15 side and the user terminal 11 side have somewhat different functional contents although may be logically identical. With the understanding that the QoS management architecture is logically the same at the base station 15 and user terminal 11, but functionally different, the following description begins with a general description of the IP QoS management architecture within a general wireless network.

Following this, the description will focus on the base station 15 to describe aspects of the QoS management architecture from the base station's perspective. Finally, the QoS management architecture from the user terminal's perspective is described.

DiffServ Model

It is noted that in the following example we assume that IP service delivery in accordance with the DiffServ service is to be implemented. How the IP QoS management architecture can be adapted to other services and models is described in general terms below under the heading "Other Services and Models".

General Description of the IP QoS Management Architecture Within a General Wireless Network

ULQM

To conduct the QoS management on an IP service delivered over a wireless link, the IP QoS management function conducted by the ULQM 10 should reach at least two goals. One is to handle the IP QoS issues from applications and the other is to provide the solution for end-to-end QoS control over their services. The basic tasks are the following. Firstly, it maps the QoS requirements from applications into the TOS/DS field in the IP header of each IP packet, where TOS stands for Type of Services used in the IntServ and DS stands for Differentiated Services. Secondly, it conducts the QoS policy enforcement in the IP sub-layer to classify, queue and shape IP flows based on certain Service Level Agreements and QoS policies. Since these tasks are common to existing wireline networks, any existing standard solution for Upper Layer QoS management may be used for the wireless QoS adaptation and control mechanism provided by the invention. Thus in the preferred embodiments, the ULQM is implemented with a standard solution for Upper Layer QoS management.

LLQM

For delivering an IP service over the air, the LLQM 12 plays an important role in the QoS management over a wireless link. It must provide the capabilities for the Link Layer of the wireless link to perform QoS control and also for the Physical Layer to actually deliver the service over the air with the required QoS. In some embodiments, the LLQM 12 has the following functions. Firstly, the LLQM 12 is able to receive information about QoS requirement for each delivered service from the ULQM 10 via the IQA 14. Secondly, it is able to map this information to an appropriate resource request for each service to attain an appropriate logical resource. Thirdly, it is able to perform the mapping from logical resource to physical resource and then start service delivery over the air. A complete LLQM 12 realization includes a complete realization of Link Layer and Physical Layer protocols. For example, the LLQM 12 realization in the Link Layer is related to LAC retransmission protocol, request admission control, dynamic resource allocation, handoff management, LAC and MAC signaling, and logical resource to physical resource mapping. One particular example of this solution will be described below for application in cdma2000 compliant wireless networks.

IQA

As mentioned above, the IQA 14 is provided between the ULQM 10 and the LLQM 12 in order to facilitate separation of ULQM and LLQM roles. More specifically, a benefit of having the IQA 14 is that the LLQM 12 can be shielded from burdens caused by coping with application details from the Upper Layers and allow the operation of the LLQM 12 to be independent of the ULQM 10.

The IQA 14 connects the ULQM 10 and the LLQM 12 in the entire IP QoS management process. In some embodiments, it has three basic functions. The first function is to translate QoS requirement parameters from the ULQM 10 to parameters which can be used by the LLQM 12. The second function is to exchange these translated QoS control parameters between the ULQM 10 and LLQM 12 so that a QoS control path for an IP traffic flow from the Upper Layers to the Physical Layer of a wireless system can be established. The third function is to assist the MAC layer (in the Link Layer) to allocate radio resources to IP services.

Figure 2:
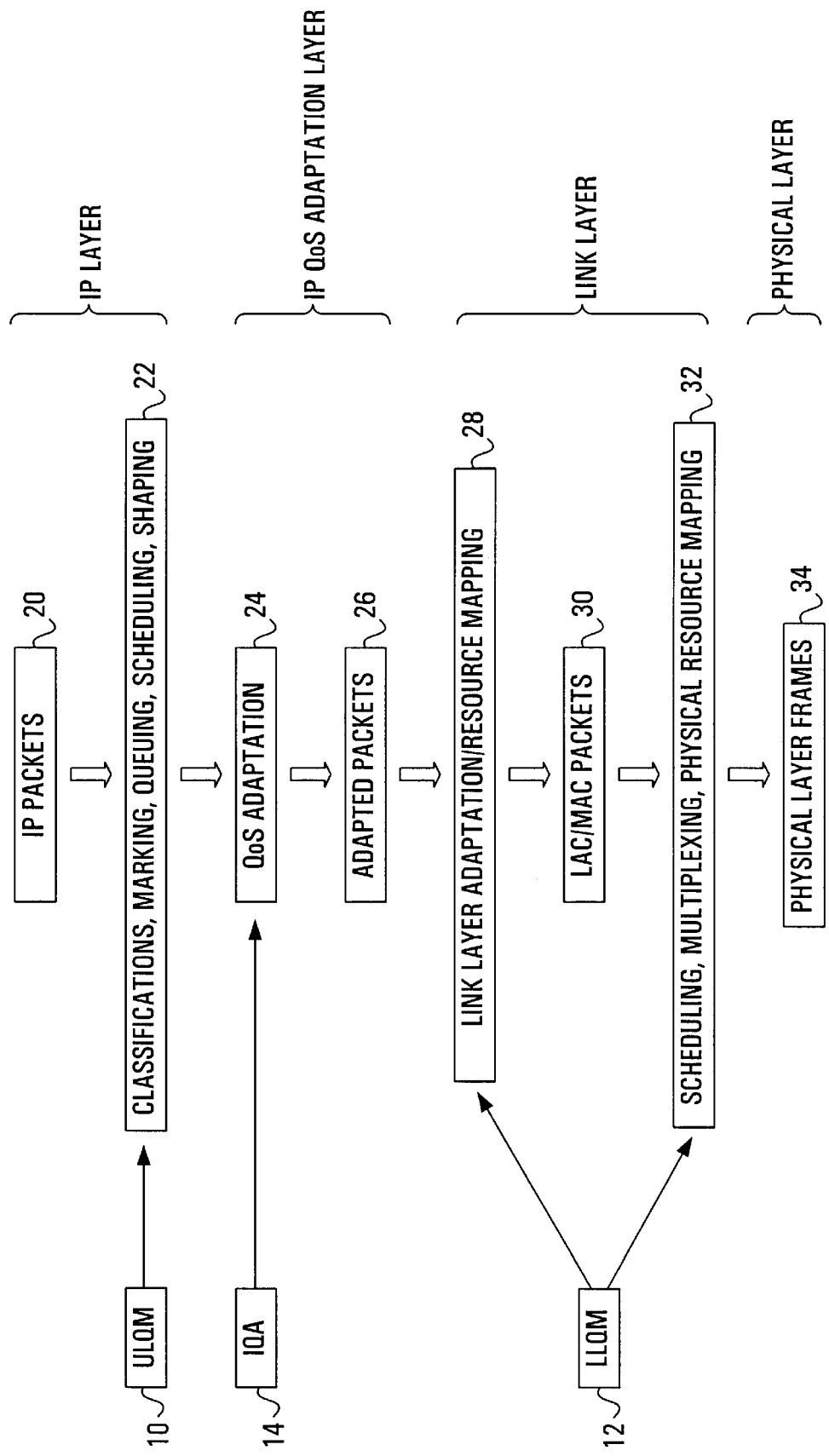
FIG. 2 is a high level view of how packets are processed in the architecture of FIG. 1.

Referring to FIG. 2, a high-level view of how IP packets are processed by the ULQM 10, IQA 14 and LLQM 12 will be described with the assumption that the QoS control path as mentioned above has already been established. IP packets 20 are firstly processed by the ULQM 10, which performs classification, marking, queuing, scheduling, and shaping 22, preferably by means of a standard Upper Layer IP QoS management solution, although a custom solution could of course alternatively be implemented. Packets thus processed are passed to the IQA 14 which performs QoS adaptation 24 on the IP packets to produce what will be referred to herein as "adapted packets" 26. The adapted packets 26 are then processed by the LLQM 12 with two steps. Firstly, a Link Layer adaptation and resource mapping 28 is performed to produce Link Layer packets (such as LAC/MAC packets) and, secondly, scheduling, multiplexing and a physical resource mapping 32 are performed to produce the Physical Layer frames 34.

In a preferred embodiment, the invention is incorporated in a cdma2000 wireless system to perform IP QoS management so that the cdma2000 wireless system is able to deliver IP services to its customers with the desired QoS. The following description will focus on this preferred embodiment to explain how the invention will be implemented in a cdma2000 wireless system. It is to be understood that the principles and methodologies of implementing the invention in a cdma2000 wireless system will also apply to other wireless systems and still be considered to be within the scope of the invention.

Wireless QoS Management From Basestation Perspective

Figure 3:
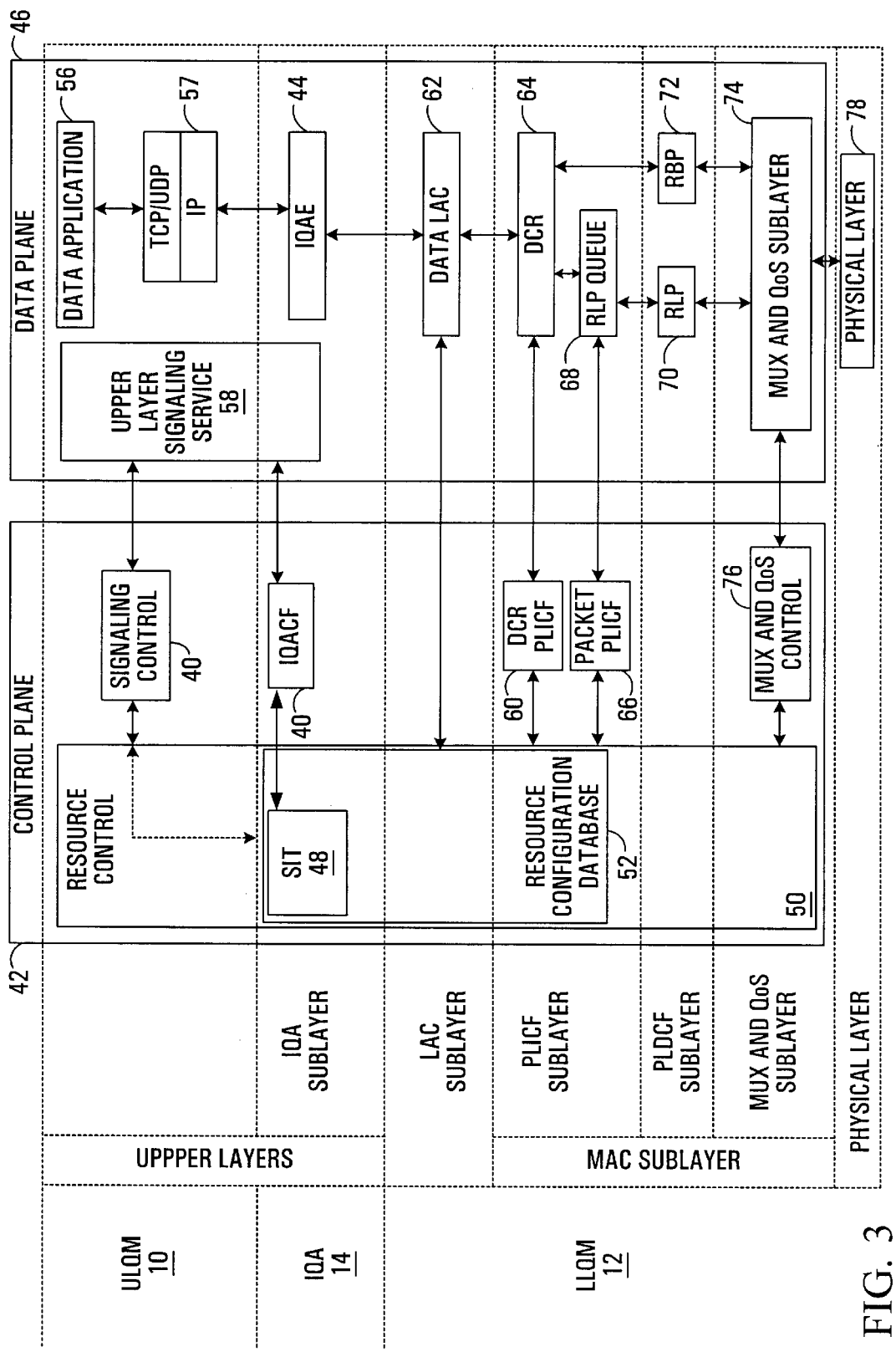
FIG. 3 is a detailed wireless IP QoS management layering structure for implementing the architecture of FIG. 1 in cdma2000 networks.

FIG. 3 illustrates a more detailed wireless IP QoS management layering structure provided by an embodiment of the invention which is based upon the cdma2000 protocol stack. For this example, it is assumed that the user terminal 11 and the base station 15 of FIG. 1 form part of a cdma2000 wireless system. For simplicity, this layering structure only provides the detailed information about the functional entities relating to IP QoS management across the Upper Layers, Link Layer and Physical Layer. These functional entities implement the ULQM 10, IQA 14, and LLQM 12 in a cdma2000 wireless system. Without loss of generality, other parts of the communication protocol stack are ignored. In addition, it is noted that logically, this layering structure is applicable to both the cdma2000 base station communication protocol stack and the cdma2000 user terminal communication protocol stack. Since an IP service request can be initiated by the base station 15 or the user terminal 11, resulting in different request processes, the following description will mainly focus on the base station 15 because it plays a dominant role in radio resource allocation. A "request" in the DiffServ context is simply an IP packet with a different code point value in the DS field. This is described in further detail below.

In conventional fashion, FIG. 3 shows the protocol 30 stack divided logically into a control plane 42 and a data plane 46. The control plane includes a RCD (resource control database) 52 and a RC (resource controller) 50 both of which are preferably implemented as defined in the cdma2000 standard but with modifications described herein. The control plane 42 has a signaling control (SC) block 40 for communicating Link Layer signaling with user terminals via an Upper Layers signaling service (ULSS) 58, which is located in the data plane 46 of the Upper Layers. The relationship of each data plane entity and its relevant control plane entity is identified with the connecting line between the two in FIG. 3.

As mentioned previously, the ULQM 10 on the cdma2000 base station side is preferably implemented by means of a standard solution. This may for example include a TCP/UDP/IP protocol stage 57 and the relevant functions for the QoS policy enforcement. More specifically, for a cdma2000 base station, the data application box 56 in the Upper Layers "generates" data packets and passes these to the TCP/UDP/IP protocol stage 57. After going through a TCP/UDP/IP protocol stage 57, these data packets become IP packets with QoS requirement parameters stored in the TOS/DS field in the IP header of each packet. Of course IP packets may also be received at the IP layer 57 from another source external to the base station 15. The TCP/UDP/IP protocol stage 57 also performs the QoS policy enforcement for classifying, queuing and shaping these IP packets based on certain Service Level Agreements and QoS policies.

According to the invention, the new IQA 14 is a new sub-layer inserted between the IP layer and the Link Layer. In some embodiments, there are two components contained in the IQA 14. One is called the IQA Entity (IQAE) 44, and is located in the data plane 46 of the cdma2000 communication protocol stack and the other is called the IQA Control Function (IQACF) 40, and is located in the control plane 42 of the stack. They perform IP packet adaptation and adaptation control, respectively.

The IQAE 44 performs IP packet adaptation for packet data transfer from the IP layer to the Link Layer. Since a base station 15 may deal with multiple user terminals 11, multiple instances of the IQAE 44, one for each user terminal, may exist in the base station 15 (FIG. 3 only gives one instance). An IQAE instance (and a corresponding IQACF instance) is created when a new user terminal 11 registers with or is handed-off to the basestation 15. Preferably a single IQAE, IQACF instance pair handles all services to a given user terminal 11.

Figure 4:
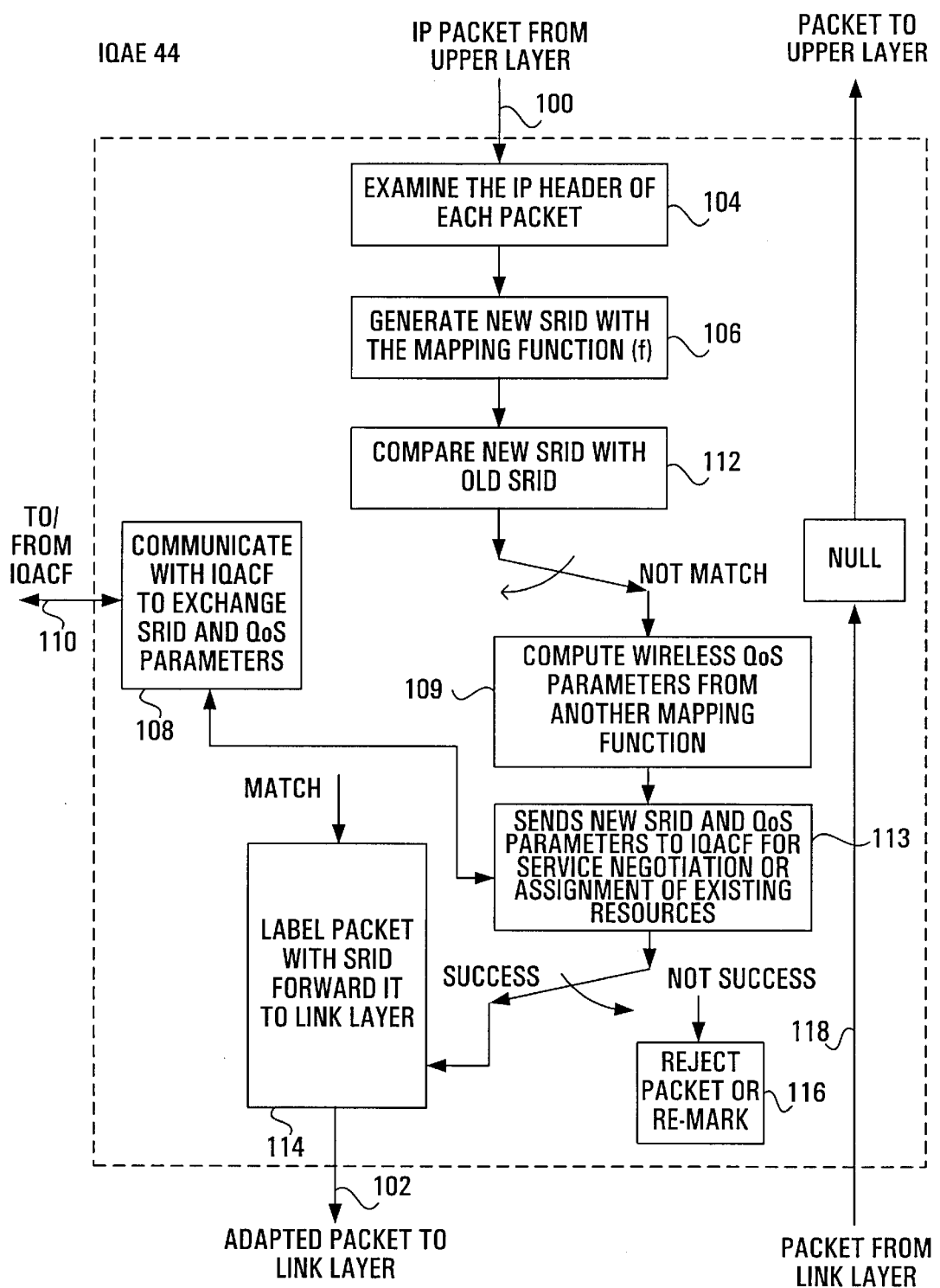
FIG. 4 is a block diagram of the internal structure of the IP QoS adaptation entity in the IQA sub-layer of FIG. 3.

The functionality of the IQAE 44 will now be described in further detail with reference to FIG. 4 which illustrates the internal structure of the IQAE 44. The IQAE 44 has an interface 100 for receiving IP packets from the ULQM 10, and an interface 102 for outputting adapted packets to the LLQM 12. The IQAE 44 has functionality 104 for examining the TCP/IP header of each packet, functionality 106 for generating a Service Reference Identification (SRID) in terms of a mapping function f(*), preferably defined as follows:

SRID=f (SA, DA, SP, DP, Protocol, TOS/DS), where SA is the IP source address, DA is the IP destination address, SP is the TCP source port, DP is the TCP destination port, Protocol is the protocol used by the IP packet and TOS/DS is the QoS parameters stored in the TOS/DS field. Preferably, the function f(*) provides a one-to-one mapping. Optionally, the IQAE 44 may elect to perform behavior aggregation by eliminating one or more of the parameters except the TOS/DS from the mapping function, for instance, SP and/or DP. In this case, multiple flows with the same TOS/DS are aggregated to receive the same QoS treatment.

The SRID is a known cdma2000 parameter, but the way it is determined based on an IP connection's parameters as described above is new. Also, the way it is used in the below detailed label switching mechanism is new. It is to be understood that another label for each service instance could alternatively be employed. The conventional SRID is a 3-bit value generated in the MUX and QoS function in the Link Layer to identify service instances. The invention changes this, preferably to an 8-bit value generated in the IQA which supports simultaneous flows between endpoints with distinct QoS's.

The IQAE 44 also has a functional block 108 for communicating with its corresponding IQACF 40 instance through an interface 110 for exchanging the service configuration status information such as the SRID. The IQAE 44 compares the SRID calculated with an existing SRID for that instance if there is one (block 112), to see whether they are identical. In the event that they do not match, in block 109 wireless QoS parameters are computed as described in detail below, and the new SRID and the computed wireless QoS parameters are forwarded to the corresponding IQACF instance for further processing. The IQACF 40 compares the computed QoS parameters with the existing service configuration, and decides if a service negotiation is required. Alternatively, the IQAE 44 may make such a decision and instruct the IQACF 40 to initiate a service negotiation. In any case, the IQACF 40 must either acknowledge the acceptance of the new SRID or its rejection to the IQAE 44 (block 113). In the event service negotiation is completed successfully or existing resources are successfully assigned, or in the event that the SRID matched an existing SRID, a functional block 114 labels each packet with its SRID thereby generating corresponding so called adapted packets and then forwards each adapted packet to the Link Layer through interface 102 for further processing. In the event that service negotiation is not completed successfully, the packet is rejected (block 116) re-marked to conform to the existing service configuration. The reverse path 118 of the IQAE 44 is simply null because there is nothing to be done with packets from the Link Layer.

As mentioned above, before service negotiation takes place, a mapping of the QoS parameters in the IP packet's header to wireless QoS parameters is performed as indicated in block 109. This mapping might alternatively be performed by the IQACF 40. Wireless QoS parameters might for example include path bandwidth estimate, minimum path latency, and priority.

The principle of the mapping function in block 109 can be demonstrated by using an example for support of Assured Forwarding (AF) PHB defined in DiffServ. AF is a means to offer different levels of forwarding assurances for IP packets. Four AF classes with three levels of drop precedence in each class have been defined in the Internet standards. The values of the AF codepoints recommended in the DS standards are summarized in the table below:

|  | Class 1 | Class 2 | Class 3 | Class 4 |
|---|---|---|---|---|
| Low Drop Prec | 001010 | 010010 | 011010 | 100010 |
| Medium Drop Prec | 001100 | 010100 | 011100 | 100100 |
| High Drop Prec | 001110 | 010110 | 011110 | 100110 |

Within each AF class IP packets are marked with one of three possible drop precedence values. In case of congestion, the packets with a higher drop precedence value are discarded prior to those with a lower drop precedence value.

Packet dropping is generally performed at the ULQM, or alternatively enforced by the LLQM when a complete ULQM function is lacking within the base station. In any event, the LLQM must allocate appropriate forwarding resources (buffer space and bandwidth) to support different AF levels. The mapping function in block 109 translates four AF classes into four priority values defined within the wireless domain, with each priority assigned to a specific amount of resources (buffer space and bandwidth). At present it is impossible to specify the exact amount of resources in the base station for each AF class because the required forwarding resources corresponding to each class has not been defined in the standards. Such a mapping relation is expected to be predefined in network provisioning according to the service level agreement and maintained by the IQAE in operation.

Figure 5:
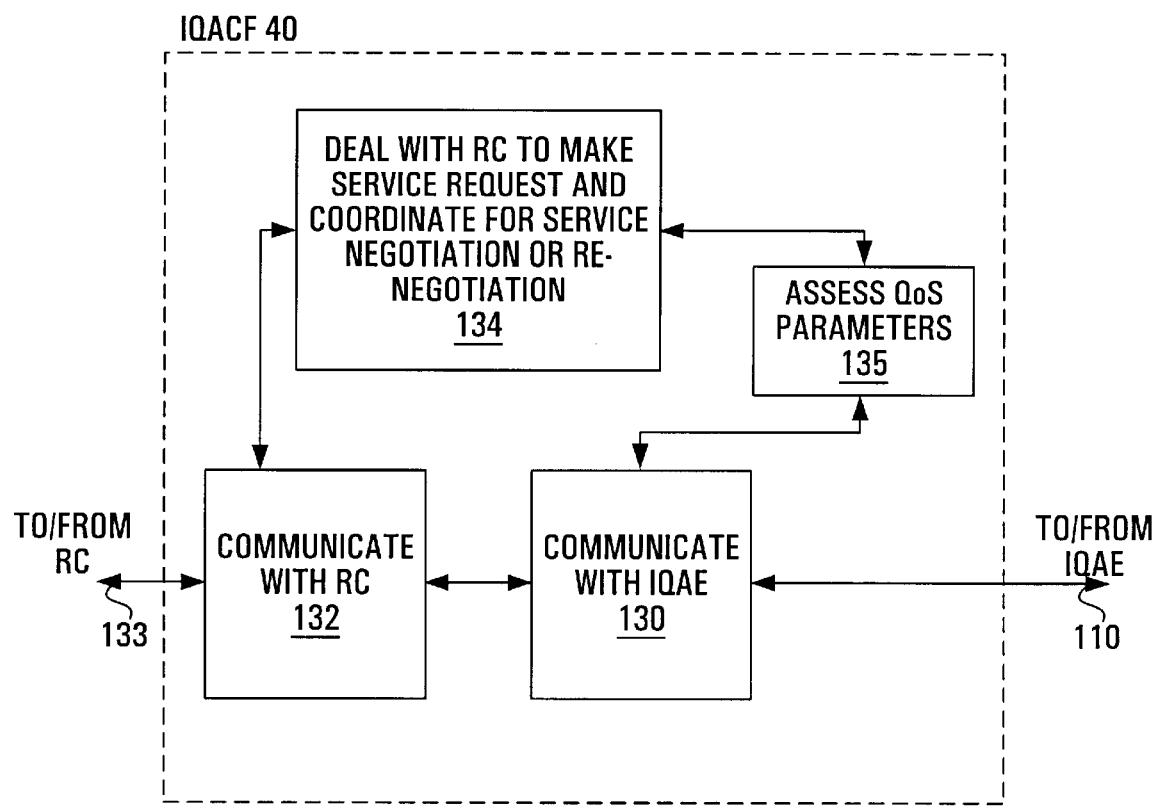
FIG. 5 is a block diagram of the internal structure of the IP QoS adaptation control function in the IQA sub-layer of FIG. 3.

The IQACF 40 performs IP packet adaptation control. As was the case for the IQAE 44, multiple instances of the IQACF 40 may exist in the base station 15, corresponding to each instance of the IQAE 44, with each IQAE 44—IQACF 40 instance pair corresponding to a respective user terminal 11. Each instance of the IQACF 40 has four functions. Referring to FIG. 5, the first function is to communicate through interface 110 with its corresponding IQAE 44 instance to exchange the service configuration status information such as SRID (block 130). The second function is to communicate through interface 133 with the RCD 52 through RC 50 in the Control Plane to exchange and record the service configuration status information such as SRID (block 132). The third function is to determine whether or not the existing service configuration can satisfy the QoS parameters (block 135). The fourth function is to deal with the RC 50 in the Control Plane for making the service requests and coordinating such things as the service negotiation or re-negotiation (block 134).

There is a data structure called the Service Instance Table (48 in FIG. 3), which contains all of the service configuration status information in the RCD 52 which is defined per the cdma2000 standard. However, the use of this data structure for implementing a QoS delivery path from the IP layer through the Link Layer to the Physical Layer is undefined in the standard specification. In a preferred embodiment, the IQACF 40 and IQAE 44 defined by the invention make use of this data structure by storing for each service instance a record in the form {SRID, wireless QoS parameters}.

Figure 6:
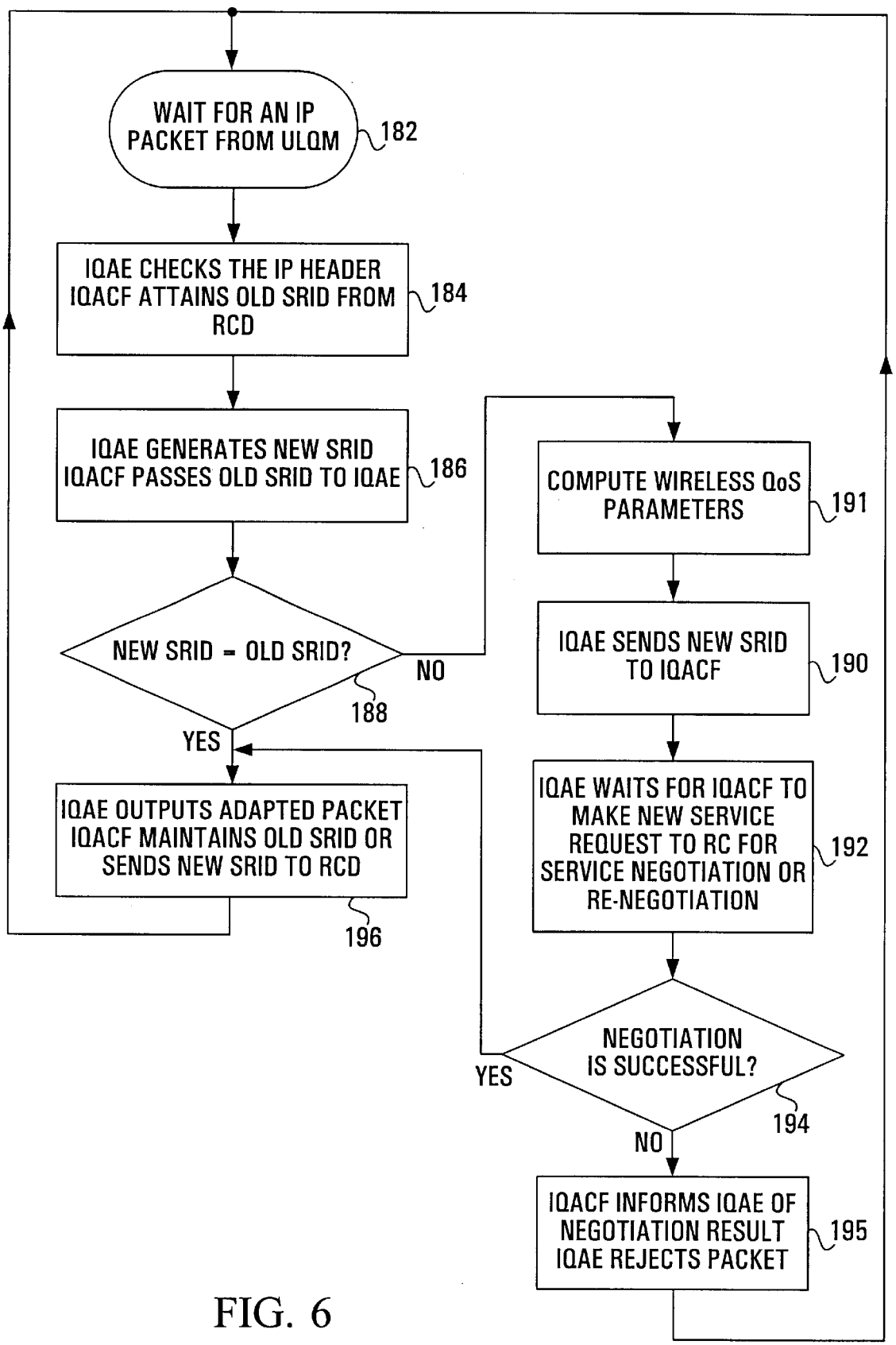
FIG. 6 is a flowchart of the operation of the entire IP QoS Adaptation sub-layer of FIG. 3.

Referring to FIG. 6, the associated operations performed by the IQACF 40 and IQAE 44 in utilizing the Service Instance Table to perform IP QoS adaptation will now be described. Once the IQA 14 creates a pair of IQAE 44 and IQACF 40 instances for an IP service associated with a particular user terminal the IQAE 44 and IQACF 40 instances enter into box 182 to wait for an IP packet to arrive from ULQM 10. When such a packet arrives, the IQAE 44 and IQACF 40 instances enter into box 184, where the IQAE 44 instance checks the IP header of the incoming IP packet and the IQACF 40 instance contacts the RCD 52 to acquire the SRID(s) from the SIT 48 of the previous packet processed by that instance. Afterwards, the IQAE 44 and IQACF 40 instances enter into box 186, where the IQAE 44 instance computes a SRID for the incoming IP packet based on the IP header information and the mapping function f(*), and the IQACF 40 instance passes the SRID of the previous packet to the IQAE 44 instance for comparison with the newly computed SRID. Alternatively, the previous SRID(s) may be stored locally in IQAE 44. At the next box 188, the IQAE 44 instance compares the new SRID with the existing one(s) to see if they are identical. If a match is found then resources for the service instance will have previously been established. The IQAE 44 and IQACF 40 instances then enter into box 196, where the IQAE 44 instance labels the IP packet with the SRID to form an adapted packet and then forwards the packet thus labelled to the Link Layer for further processing, and the IQACF 40 instance maintains the previous SRID in the SIT 48. If there is no match between the newly computed SRID and the previous SRID(s) then something is different in the incoming IP packet header compared with that of the previous packet. In this case, the IQAE 44 and IQACF 40 instances enter into box 190, where the IQAE 44 instance sends the new SRID to the IQACF 40 instance. After that, the IQAE 44 and IQACF 40 instances enter into box 192, where the IQAE 44 instance has nothing to do, just waiting for the IQACF 40 instance to either allocate existing resources or make a new service request to RC 50 for service negotiation or re-negotiation. At box 191, wireless QoS parameters are computed, either by the IQAE in which case it is done before box 190, or by the IQACF in which case it is done after box 190 as shown. If the negotiation is not successful, the IQACF 40 instance informs IQAE 44 of the result to reject the incoming packet (box 195) and then the IQAE 44 and IQACF 40 instances go back to the box 182. If the negotiation is successful, the IQAE 44 and IQACF 40 instances enter into box 196, where the IQAE 44 instance labels the IP packet with the new SRID to form an adapted packet and then forwards it to the Link Layer for further processing, and the IQACF 40 instance adds a new service record on the Service Instance Table 48 in the RCD 52 containing the new SRID. Then, both instances 40,44 go back to the box 182. At this point, a complete operation cycle of the IQA 14 is finished.

The ULQM 10 and IQA 14 components of the IP QoS management architecture for a cdma2000 base station have now been described in detail. The remaining part of the architecture is the LLQM 12. To understand the LLQM 12, some knowledge about the cdma2000 Link Layer is necessary and therefore, a brief introduction is given hereinbelow for the cdma2000 Link Layer before describing the LLQM 12.

Referring again to FIG. 3, recall the Link Layer communication protocol stack of a cdma2000 system can be divided into two planes called data plane 42 and control plane 46 from the functionality perspective. For an IP data service instance, the date plane 46 contains entities such as data link access control (Data LAC) 62, dedicated/common router (DCR) 64, radio link protocol (RLP) queue 68, RLP 70, radio burst protocol (RBP) 72 and Mux/QoS control sublayer 74. To control these entities, the control plane 42 contains corresponding control functions called resource control (RC) 50, DCR Physical Layer independent convergence function (PLICF) 60, packet PLICF 66 and Mux/QoS control function 76. In addition to that, the control plane 42 also contains the previously referenced resource configuration database 52 for recording all of resource configuration information and a signaling control (SC) 54 for communicating Link Layer signaling with user terminals via Upper Layers signaling service (UPSS) 58, which is located in. the data plane 46 of the Upper Layers. The relationship of each data plane entity and its relevant control plane entity is identified with the connecting line between the two in FIG. 3. The detailed functional definitions of all of these entities can be found in the cdma2000 standard.

With this brief introduction, the LLQM 12 of a cdma2000 base station 15 can now be described with further reference to FIG. 3. To begin, the Link Layer receives each adapted packet from the IQAE 44. During the service negotiation stage, Logical Link Layer resources have previously been established which have the required wireless QoS parameters. A table called the service-to-logical resource mapping table is defined to store the mapping from an SRID to a logical resource thus established. This table is accessible by the Link Layer and is preferably stored as an additional component in the RCD 52. It stores records of the form {SRID, Logical Channel ID}. In cdma2000, examples of logical channels include r-dtch and f-dtch. dtch means Dedicated Traffic Channel, and is a logical channel used to carry user data traffic. r-dtch is the reverse link dedicated traffic channel and f-dtch is the forward link dedicated traffic channel. Furthermore, dmch stands for dedicated MAC channel. This is a logical channel used to carry Medium Access Control (MAC) messages. csch stands for common signaling channel. It is a forward or reverse logical channel used to carry user signaling data. Individual packets are processed by the Link Layer forwarding each packet to the appropriate logical channel on the basis of the packet's SRID and the above described logical resource mapping table. It is noted that the SRID→logical channel mapping could alternatively be performed in the MAC sub-layer.

Figure 7:
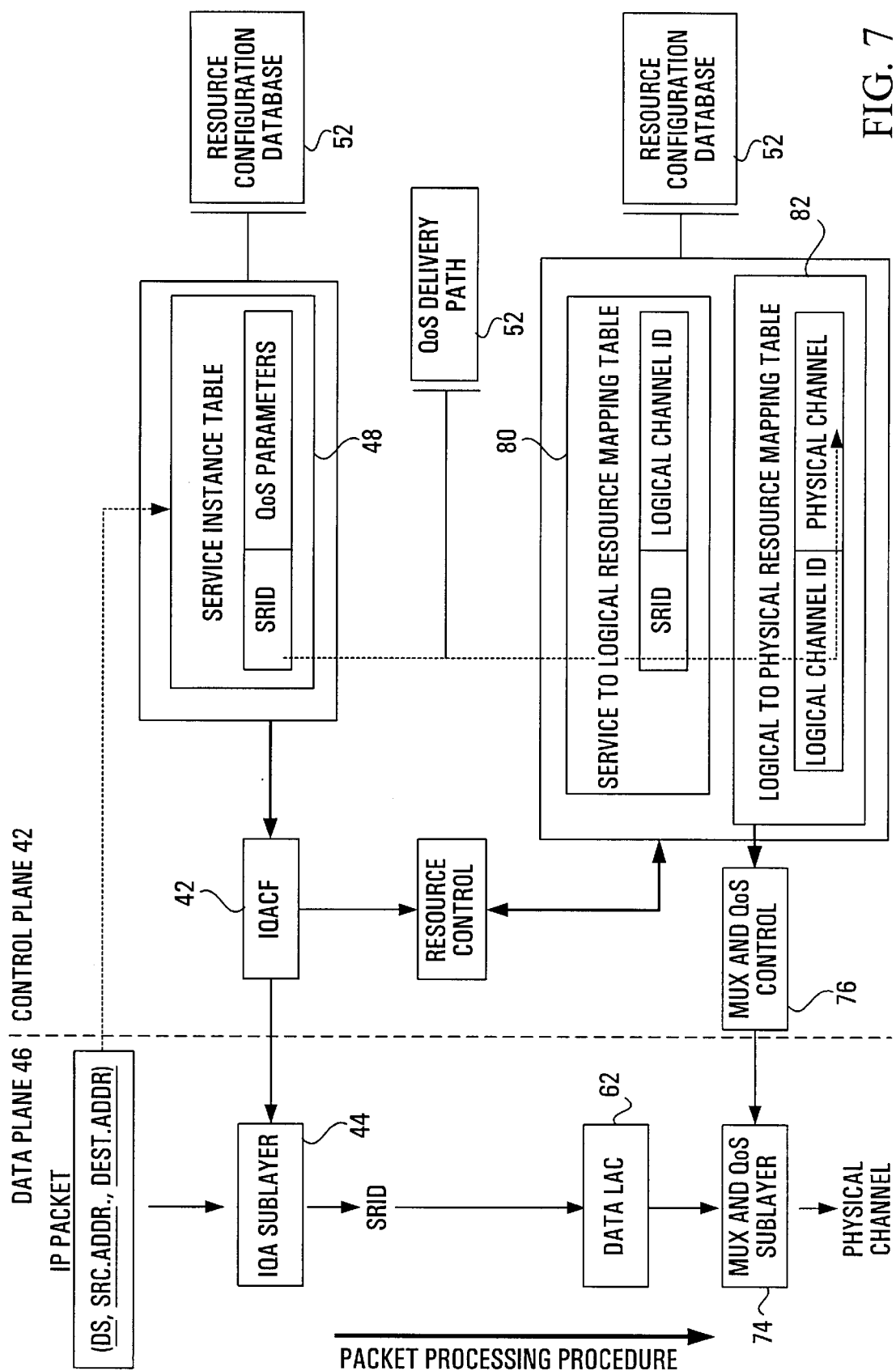
FIG. 7 is a flow diagram of the QoS management delivery process and path showing the use of data structures.

Below the data LAC 62 is the MAC sub-layer of the Link Layer. According to the cdma2000 standard, the MAC machine relating to a particular packet data service instance has four work states, which are Active State, Control Hold State, Suspended State and Dormant State. On which state the MAC machine should work depends on the current service instance status, active or inactive, and the current system's resource configuration status. The QoS requirement of each active service instance in the system is one of the important parameters to determine this resource configuration status for the whole system. The MAC sub-layer fulfills part of the LLQM tasks to ensure the MAC machine relating to a particular service instance is working in the correct work state while the MAC machine serves packets from the Data LAC 44. This is achieved with two important radio resource management algorithms, which are the admission control algorithm and the resource allocation algorithm. The detailed study on these algorithms is beyond the scope of this invention, so further information on these algorithms is not provided herein. It is to be understood that whatever type of admission control algorithms and resource allocation algorithms are employed with the invention, they will participate in the QoS management delivery process as shown in FIG. 7, which will be described later. During service negotiation, appropriate physical resources are setup and allocated to given logical channels. A table called the logical-to-physical resource mapping table is maintained, preferably in the RCD 52, and contains records of the form {Logical Channel ID, Physical Channel}. In cdma2000, examples of physical channels include FCH (fundamental channel) and SCH (supplemental channel).

Now, the packet flow in the MAC sub-layer under the control of LLQM 12 is described. Firstly, the DCR 64 provides the routing for the packet from the Data LAC 44 to use the appropriate Link Layer resource, as defined by the logical channel mapping table for example RLP 70 or RBP 72 under the control of the DCR PLICF 60 based on the current state of the MAC machine relating to the service instance. If the packet is directed to the RLP Queue 68 by the DCR 64, it will be queued if the queue is not empty and then it is passed to the RLP 70 by the RLP queue 68 under the control of the Packet PLICF 66. On the other hand, if the packet is not directed to the RLP Queue 68, then it is switched to the RBP 72. The operations of the RLP Queue 68, RLP 70 and RBP 72 follow the cdma2000 standard. No matter which radio protocol the DCR PLICF 60 chooses, the particular logical channel to which the packet is forwarded inherently contains information about the relevant QoS management. The Mux/QoS Control sub-layer 74 under the control of the Mux/QoS Control Function 76 with the use of the logical-to-physical resource mapping table maps the logical resource to the appropriate physical resource and forwards the packet to the physical resource thus identified. Finally, the Physical Layer transmission technologies physically deliver the packet over the air with the required QoS so that the complete LLQM 12 is realized.

As a result of a successful setup as described in detail above, a virtual QoS management delivery path is established between the Upper Layers and the LAC/MAC resources for an IP traffic flow with a certain QoS. For the purpose of the QoS management delivery process, this path is identified by a series of mappings: SRID→Logical Channel ID→Physical Channel ID. Along with this path, the required LAC/MAC and physical resources are reserved and allocated to the traffic flow. This is summarized in FIG. 7. In FIG. 7, data plane 46 and control plane 42 functionality is again distinguished. The IQA sub-layer 14 is shown to perform a first mapping based on the service instance table 48, by adding an appropriate SRID label to each IP packet. The data LAC function 62 in the Link Layer maps this to a logical channel ID taken from the service to logical resource mapping table 80 and passes the packet to the logical channel thus identified. Alternatively when the LAC layer is absent (a null LAC), the DCR at the MAC layer may perform such a task. Finally, the MUX and QoS sub-layer 74 maps the logical channels to corresponding physical channels with the logical-to-physical resource mapping table 82.

Figure 8:
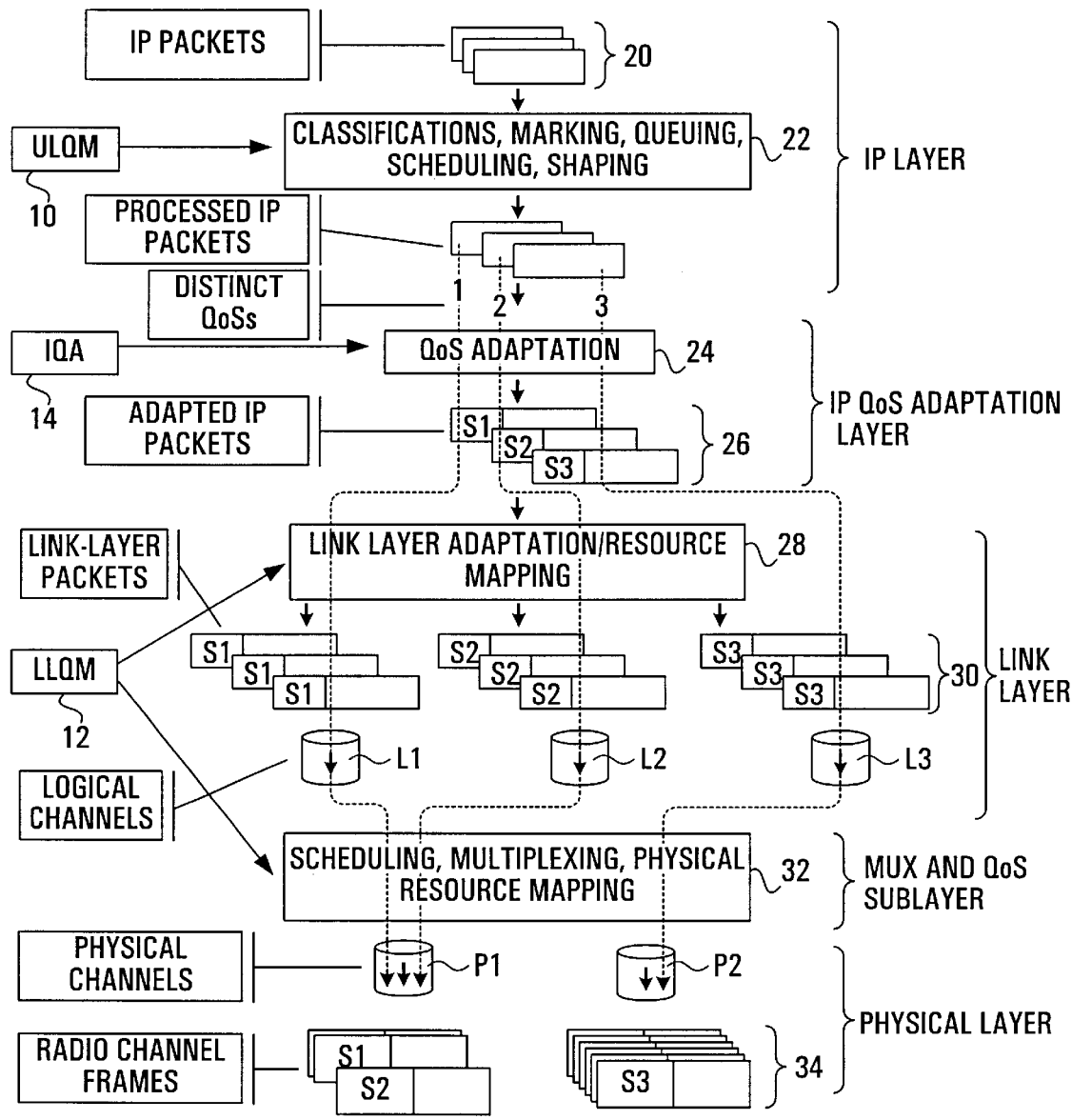
FIG. 8 is an example of a QoS management implementation using the invention.

As an example, FIG. 8 shows how different QoS requirements are supported across the ULQM 10 and LLQM 14 by using the above mechanism. In this example, the processing of incoming IP packets to/from a particular user terminal by the UQLM 10 results in three distinct levels of qualities of services. Three QoS delivery paths are created for three service instances, each having its own QoS requirement. For this example, to provide the three QoS's, there are three different SRIDs S1,S2,S3, three different Link Layer logical channels identified by L1,L2,L3, and two physical channels identified by P1,P2.

The IQA sub-layer 14 adapts and translates these QoS requirements and assigns a different SRID (i.e., S1, S2 and S3) to each traffic flow of the service instance accordingly. Each packet is labelled with one of these SRIDs. The IQAE 44 uses these SRIDs to relate each packet from a service instance to a QoS management delivery path and forwards the packet to the appropriate Link Layer which assigns it to the corresponding resource identified by a logical channel ID read from the service-to-logical resource mapping table.

For this example, it is assumed that the QoS requirement for the service instance S1 and S2 can be supported on a shared physical channel P1 (i.e., that multiple logical channels from multiple service options can be mapped to a single physical channel), and the QoS requirement for the service instance S3 is to be supported on a dedicated physical channel P2. As a result, the Mux/QoS control sub-layer multiplexes the packets of L1 and L2 and maps them to physical channel P1, and sends the packets of L3 to physical channel P2.

Up to this point, the description of the invention had been focusing on the scenario where the IP service request is initiated by a cdma2000 base station. In principle, the methodology and description also apply to the QoS management in a cdma2000 user terminal with the differences as follows.

Wireless QoS Management From User Terminal Perspective

For a cdma2000 user terminal 11, the functional structure of the terminal is modeled with the same communication protocol stack as that for a cdma2000 base station 15, which is as shown in FIG. 3. However, the user terminal 11 can not allocate the resources to itself. Its RCD 52 just records the resource configuration information regarding its own service instances. There is only a single IQAE 44 and IQACF 40 in the user terminal. This information is transmitted from the RCD 52 of the base station 15 serving the user terminal 11 to the RCD 52 of the user terminal via the base station SC 54 and ULSS 58, over the air, and via the terminal SC 54 and ULSS 58. Preferably, the ULQM 10 and IQA 12 are the same for the terminal 11 as that for the base station 15. The difference is in the LLQM 12.

When an IP service request is initiated within the user terminal 11, it is sent to the ULSS 58 in the Data Plane 46 of the base station 15 via the path including the SC 54 and ULSS 58 within the terminal 11 and a physical common access channel from the terminal 11 to the base station 15 over the air. The ULSS 58 of the base station then forwards the request to the Signaling Control (SC) 54, which coordinates with the RC 50 to allocate resources including the logical and physical resources to the user terminal. The resultant resource assignment information will be sent back to the user terminal via the path from the RC 50, SC 54 and ULSS 58 within the base station, a physical common paging channel from the base station 15 to the user terminal 11 over the air, and the ULSS 58, SC 54 and RC 50 within the user terminal 11. With this information, the RC 50, data LAC 62, DCR PLICF 60, Packet PLICF 66 and Mux/QoS Control 76 in the control plane within the user terminal 11 control their respective entities in the date plane to establish the QoS management delivery process and path in the same way as that for the base station 15, and perform the LLQM on the packet traffic flow within the user terminal 11.

Other Services and Models

The above example has been fairly specific to the provisioning of QoS for IP in a DiffServ context in a cdma2000 network. It is to be understood that with appropriate modifications which would be understood by one skilled in the art, the invention could be applied to providing QoS for Upper Layers packets of a different type than IP, or in a different IP context then DiffServ. Furthermore, it is to be understood that it can be applied in any wireless network with multiple physical and logical channels, not just cdma2000.

Numerous modifications and variations of the present invention are possible in light of the above teachings. It is therefore to be understood that within the scope of the appended claims, the invention may be practiced otherwise than as specifically described herein.

We claim:

1. A QoS management architecture for delivering an incoming stream of packets over a wireless link with a QoS comprising:
   a ULQM (Upper Layer QoS (quality of service) management layer) in an Upper Layer of a wireless network;
   a LLQM (Lower Layer QoS management layer) in a Link Layer of a wireless network;
   a IQA (IP QoS adaptation) sub-layer between the ULQM and the LLQM for perform packet adaptation such that QoS requirement parameters from the ULQM can be effectively translated and utilized by the LLQM; and
   wherein the IQA comprises functionality to:
   determine for each packet if it belongs to an existing stream or a new stream;
   in the event the packet belongs to a new stream, map the QoS requirement parameters to corresponding wireless QoS parameters, coordinating the allocation of existing wireless resources to handle the new stream with the corresponding wireless QoS parameters, or coordinating service negotiation or re-negotiation if existing wireless resources are insufficient.

2. A wireless user terminal adapted to have the QoS management architecture of claim 1.

3. A base station adapted to have the QoS management architecture of claim 1.

4. A QoS management architecture according to claim 1 wherein the stream of packets are IP packets.

5. A QoS management architecture according to claim 4 wherein the wireless link is a cdma2000 (or variant, evolution thereof) wireless link.

6. The QoS management architecture of claim 1 further comprising:
   in the IQA, labeling each packet with a first label identifying the packet stream it belongs to and then passing the packet to the LLQM.

7. The QoS management architecture of claim 1 wherein coordinating allocation of resources to handle the new stream comprises allocating a Link Layer logical resource to the new stream.

8. The QoS management architecture of claim 1 wherein coordinating allocation of resources to handle the new stream comprises allocating a Physical Layer resource to the new stream.

9. The QoS management architecture of claim 7 wherein coordinating allocation of resources to handle the new stream comprises allocating a Physical Layer resource to the new stream.

10. The QoS management architecture of claim 7 further comprising a label switching mechanism adapted to label each packet with a label identifying the particular stream.

11. The QoS management architecture of claim 10 further comprising a label processing mechanism in the Link Layer adapted to pass each packet to an appropriate Link Layer logical resource.

12. The QoS management architecture of claim 10 further mapping mechanism for passing packets on the basis of the label from the Link Layer logical resource assigned to a given stream to a Physical Layer resource assigned to the stream.

13. The QoS management architecture of claim 12 wherein a control component maintains a first mapping from the label to wireless QoS parameters, a second mapping from the first label to the Link Layer logical resource, and a third mapping from the Link Layer logical resource to the Physical Layer resource.

14. A QoS management architecture according to claim 1, wherein the IQA comprises a QAE (QoS Adaptation Entity) in the Data Plane of the cdma2000 communication protocol stack and a QACF (QoS Adaptation Control Function) in the Control Plane of the cdma2000 communication protocol stack.

15. A QoS management architecture according to claim 14 wherein the IQA has internal functions comprising for each packet: examining endpoint and the QoS requirement parameters, generating a label with a mapping function from the endpoint information and the QoS requirement parameters, comparing the label with any previous labels to see whether they are identical, labeling the packet with new label and forwarding the packet to the Link Layer, and in the event they are not identical performing a mapping from the QoS requirement parameters to wireless QoS parameters and dealing with a resource control entity for making service requests and coordinating service negotiation or re-negotiation.

16. A QoS management architecture according to claim 15 wherein the mapping function is a one-to-one mapping, and is a function of source address, destination address, port, protocol, and QoS parameters.

17. A QoS management architecture according to claim 15 wherein the mapping function performs behavior aggregation by eliminating one or more of the parameters except the QoS requirement parameters from the mapping function, such that multiple streams with the same QoS requirement parameters are aggregated to receive the same QoS treatment.

18. A QoS management architecture according to claim 15 wherein a QoS requirement parameter delivery path comprising:

SRID→Logical Channel ID→Physical Channel ID is is established by the QoS management architecture.

19. An IP QoS adaptation sub-layer adapted for inclusion between Upper Layers and Lower Layers of a protocol stack for delivering an IP packet service over a wireless link, the protocol stack having a resource control entity, the IP QoS sub-layer comprising:

control plane functionality for coordinating with the resource control entity the allocation of existing logical channel and physical channel resources and/or establishment and allocation of new logical channel and physical channel resources to new IP packet flows, an IP packet flow being a sequence of packets with the same endpoint and QoS requirement parameters, and for maintaining or coordinating a mapping for each IP packet flow to the logical channel and physical channel resources thus allocated and/or established;

data plane functionality for adapting each packet in a manner which allows the Lower Layers to determine which previously allocated logical channel and physical channel resources to use for the packet through the use of said mapping.

20. A wireless user terminal adapted to have the QoS management architecture of claim 19.

21. A base station adapted to have the QoS management architecture of claim 19.

22. A cdma2000 compliant wireless user terminal according to claim 20.

23. A cdma2000 compliant base station according to claim 21.

24. A QoS management architecture for delivering an incoming stream of packets over a wireless link with a QoS comprising:

a ULQM (Upper Layer QoS (quality of service) management layer) in an Upper Layer of a wireless network;

a LLQM (Lower Layer QoS management layer) in a Link Layer of a wireless network;

a IQA (IP QoS adaptation) sub-layer between the ULQM and the LLQM for performing packet adaptation such that QoS requirement parameters from the ULQM can be effectively translated and utilized by the LLQM; and wherein the IQA comprises functionality to:

map the QoS requirement parameters to corresponding wireless QoS parameters, coordinate the allocation of existing wireless resources to handle a new stream with the corresponding wireless QoS parameters, or coordinate service negotiation or re-negotiation if existing wireless resources are insufficient.

* * * * *